US012784658B2

(12) United States Patent
Min et al.

(10) Patent No.: US 12,784,658 B2
(45) Date of Patent: Nov. 3, 2026

(54) DISPLAY DEVICE, METHOD OF DRIVING THE DISPLAY DEVICE, AND ELECTRONIC DEVICE INCLUDING THE DISPLAY DEVICE

(71) Applicant: Samsung Display Co., LTD., Yongin-si (KR)

(72) Inventors: Jungki Min, Yongin-si (KR); Ji-Woong Jeong, Yongin-si (KR); Boyoung An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/082,710

(22) Filed: Mar. 18, 2025

(65) Prior Publication Data

US 2025/0384815 A1 Dec. 18, 2025

(30) Foreign Application Priority Data

Jun. 18, 2024 (KR) ........................ 10-2024-0078743

(51) Int. Cl.
*G09G 3/32* (2016.01)

(52) U.S. Cl.
CPC ....... *G09G 3/32* (2013.01); *G09G 2310/0275* (2013.01); *G09G 2320/041* (2013.01); *G09G 2320/0666* (2013.01)

(58) Field of Classification Search
CPC ...... G09G 3/32–3291; G09G 2300/0421–043; G09G 2300/0809; G09G 2300/0819; G09G 2310/0243; G09G 2310/0275; G09G 2310/06; G09G 2310/08; G09G 2320/0233; G09G 2320/0242;
(Continued)

(56) References Cited

U.S. PATENT DOCUMENTS

2013/0249932 A1* 9/2013 Siotis ........................ G09G 3/20 345/589
2020/0357338 A1* 11/2020 Lee ....................... G09G 3/3258
(Continued)

FOREIGN PATENT DOCUMENTS

KR 10-2015-0064798 A 6/2015
KR 10-2018-0002099 A 1/2018
(Continued)

*Primary Examiner* — Nathan Danielsen
(74) *Attorney, Agent, or Firm* — Womble Bond Dickinson (US) LLP

(57) ABSTRACT

A method of driving a display device includes measuring a temperature of a sub-pixel; sensing the sub-pixel to generate sensing data; compensating for input image data based on the temperature of the sub-pixel and the sensing data to generate a data signal; and generating a data voltage based on the data signal to provide the data voltage to a display panel, wherein a first color sub-pixel is sensed to generate first sensing data, and a temperature of the first color sub-pixel is measured during a first period, wherein a second color sub-pixel is sensed to generate second sensing data, and a temperature of the second color sub-pixel is measured during a second period following the first period, and wherein a third color sub-pixel is sensed to generate third sensing data, and a temperature of the third color sub-pixel is measured during a third period following the second period.

18 Claims, 7 Drawing Sheets

(58) Field of Classification Search
CPC .......... G09G 2320/029–041; G09G 2320/066; G09G 2320/0693
See application file for complete search history.

(56) References Cited

U.S. PATENT DOCUMENTS

| | | | | |
|---|---|---|---|---|
| 2022/0215802 A1* | 7/2022 | Moriya | ................ | G09G 3/3233 |
| 2023/0162670 A1* | 5/2023 | Bang | .................... | G09G 3/3225 345/204 |
| 2024/0054950 A1* | 2/2024 | Hou | ..................... | G09G 3/3208 |

FOREIGN PATENT DOCUMENTS

| | | |
|---|---|---|
| KR | 10-2019-0014850 A | 2/2019 |
| KR | 10-2279397 B1 | 7/2021 |

* cited by examiner

DISPLAY DEVICE, METHOD OF DRIVING THE DISPLAY DEVICE, AND ELECTRONIC DEVICE INCLUDING THE DISPLAY DEVICE

CROSS-REFERENCE TO RELATED APPLICATION

The present application claims priority to and the benefit of Korean Patent Application No. 10-2024-0078743, filed on Jun. 18, 2024, in the Korean Intellectual Property Office, the entire disclosure of which is incorporated herein by reference.

BACKGROUND

1. Field

Aspects of embodiments of the present inventive concept relate to a display device and a method of driving the display device, and an electronic device including the display device.

2. Description of the Related Art

A sub-pixel may have a unique electrical characteristics such as a threshold voltage, a mobility of a driving transistor, etc., and the electrical characteristics of the sub-pixel may differ for each sub-pixel due to a process deviation, a deterioration degree, etc. A difference of the electrical characteristics of the sub-pixels may deteriorate a display quality of a display device.

In order to compensate for the electrical characteristics of the sub-pixels, the display device may perform a sensing operation on the sub-pixels to generate sensing data. In addition, in order to improve an accuracy of the sensing operation, the display device may measure a temperature of the sub-pixel. The display device may determine the electrical characteristics of the sub-pixel based on the temperature of the sub-pixel and the sensing data, and may compensate for input image data based on the electrical characteristics of the sub-pixel.

The sensing operation may be performed in a power-on state or a power-off state of the display device. However, in the power-off state of the display device unlike the power-on state of the display device, the sensing operation may be performed for a relatively long time (e.g., several minutes), and while the sensing operation is performed, the temperature of the sub-pixel may change. Therefore, the sensing operation may be inaccurate.

The above information disclosed in this Background section is only for enhancement of understanding of the background of the invention and therefore it may contain information that does not form.

SUMMARY

Aspects of some embodiments of the present inventive concept are directed to a display device for performing a sensing operation considering a temperature of a sub-pixel which changes during the sensing operation.

Aspects of some embodiments of the present inventive concept are directed to a method of driving the display device.

Aspects of some embodiments of the present inventive concept are directed to an electronic device including the display device.

According to some embodiments of present inventive concept, there is provided a display device performing a sensing operation, including: a display panel including a sub-pixel; a temperature measurement part configured to measure a temperature of the sub-pixel; a sensing part configured to sense the sub-pixel to generate sensing data; a driving controller configured to compensate for input image data based on the temperature of the sub-pixel and the sensing data to generate a data signal; and a data driver configured to generate a data voltage based on the data signal to provide the data voltage to the display panel, wherein the display panel includes a first color sub-pixel, a second color sub-pixel, and a third color sub-pixel, wherein the sensing part is configured to sense the first color sub-pixel to generate first sensing data during a first period, to sense the second color sub-pixel to generate second sensing data during a second period following the first period, and to sense the third color sub-pixel to generate third sensing data during a third period following the second period, and wherein the temperature measurement part is configured to measure a temperature of the first color sub-pixel during the first period, to measure a temperature of the second color sub-pixel during the second period, and to measure a temperature of the third color sub-pixel during the third period.

In some embodiments, the driving controller is configured to compensate for the input image data based on the temperature of the sub-pixel and the sensing data in response to the sensing operation taking longer than a reference period of time.

In some embodiments, the driving controller is configured to compensate for the input image data based on the temperature of the subpixel and the sensing data in response to the display device being powered off.

In some embodiments, the temperature of the subpixel changes over time.

In some embodiments, the temperature of the subpixel decreases over time.

In some embodiments, the driving controller is configured to calculate a first temperature map based on the temperature of the first color sub-pixel, to calculate a second temperature map based on the temperature of the second color sub-pixel, and to calculate a third temperature map based on the temperature of the third color sub-pixel.

In some embodiments, the first temperature map, the second temperature map, and the third temperature map are generated in a unit of the sub pixel.

In some embodiments, the first temperature map, the second temperature map, and the third temperature map are generated in a unit of a sub-pixel row.

In some embodiments, the driving controller is configured to generate a first temperature compensation value based on the first temperature map and a first lookup table, to generate a second temperature compensation value based on the second temperature map and a second lookup table, and to generate a third temperature compensation value based on the third temperature map and a third lookup table.

In some embodiments, the driving controller is configured to generate a first sensing compensation value based on the first sensing data, a second sensing compensation value based on the second sensing data, and a third sensing compensation value based on the third sensing data.

In some embodiments, the driving controller is configured to add the first temperature compensation value and the first sensing compensation value to generate a compensation value of the first color sub-pixel, to add the second temperature compensation value and the second sensing compensation value to generate a compensation value of the second color sub-pixel, and to add the third temperature compensation value and the third sensing compensation value to generate a compensation value of the third color sub-pixel.

In some embodiments, the first color sub-pixel is a red sub-pixel, the second color sub-pixel is a green sub-pixel, and the third color sub-pixel is a blue sub-pixel.

In some embodiments, the first color sub-pixel is a green sub-pixel, the second color sub-pixel is a red sub-pixel, and the third color sub-pixel is a blue sub-pixel.

In some embodiments, the first color sub-pixel is a blue sub-pixel, the second color sub-pixel is a red sub-pixel, and the third color sub-pixel is a green sub-pixel.

In some embodiments, the temperature measurement part is configured to measure the temperature of the subpixel using a temperature sensor.

In some embodiments, the temperature measurement part is configured to measure the temperature of the sub-pixel based on a driving current according to a gate-source voltage of a driving transistor included in the sub-pixel.

In some embodiments, the sensing part is included in the data driver.

According to some embodiments of present inventive concept, there is provided a method of driving a display device performing a sensing operation, the method including: measuring a temperature of a sub-pixel; sensing the sub-pixel to generate sensing data; compensating for input image data based on the temperature of the sub-pixel and the sensing data to generate a data signal; and generating a data voltage based on the data signal to provide the data voltage to a display panel, wherein a first color sub-pixel is sensed to generate first sensing data, and a temperature of the first color sub-pixel is measured during a first period, wherein a second color sub-pixel is sensed to generate second sensing data, and a temperature of the second color sub-pixel is measured during a second period following the first period, and wherein a third color sub-pixel is sensed to generate third sensing data, and a temperature of the third color sub-pixel is measured during a third period following the second period.

In some embodiments, the input image data is compensated based on the temperature of the sub-pixel and the sensing data in response to the sensing operation taking longer than a reference period of time.

According to some embodiments of present inventive concept, there is provided an electronic device performing a sensing operation, including: a display panel including a sub-pixel; a temperature measurement part configured to measure a temperature of the sub-pixel; a sensing part configured to sense the sub-pixel to generate sensing data; a driving controller configured to compensate for input image data based on the temperature of the sub-pixel and the sensing data to generate a data signal; a data driver configured to generate a data voltage based on the data signal to provide the data voltage to the display panel; and a processor configured to provide the input image data to the driving controller, wherein the display panel includes a first color sub-pixel, a second color sub-pixel, and a third color sub-pixel, wherein the sensing part is configured to sense the first color sub-pixel to generate first sensing data during a first period, to sense the second color sub-pixel to generate second sensing data during a second period following the first period, and to sense the third color sub-pixel to generate third sensing data during a third period following the second period, and wherein the temperature measurement part is configured to measure a temperature of the first color sub-pixel during the first period, to measure a temperature of the second color sub-pixel during the second period, and to measure a temperature of the third color sub-pixel during the third period.

According to some embodiments, even if the sensing operation is performed for a relatively long time (e.g., several minutes) and the temperature of the sub-pixel changes, the temperature of the sub-pixel may be measured during the sensing period of the sub-pixel, and the input image data may be compensated based on the temperature of the sub-pixel and the sensing data of the sub-pixel. Accordingly, the sensing operation may be performed accurately.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION

Hereinafter, the present inventive concept will be described in more detail with reference to the accompanying drawings.

Figure 1:
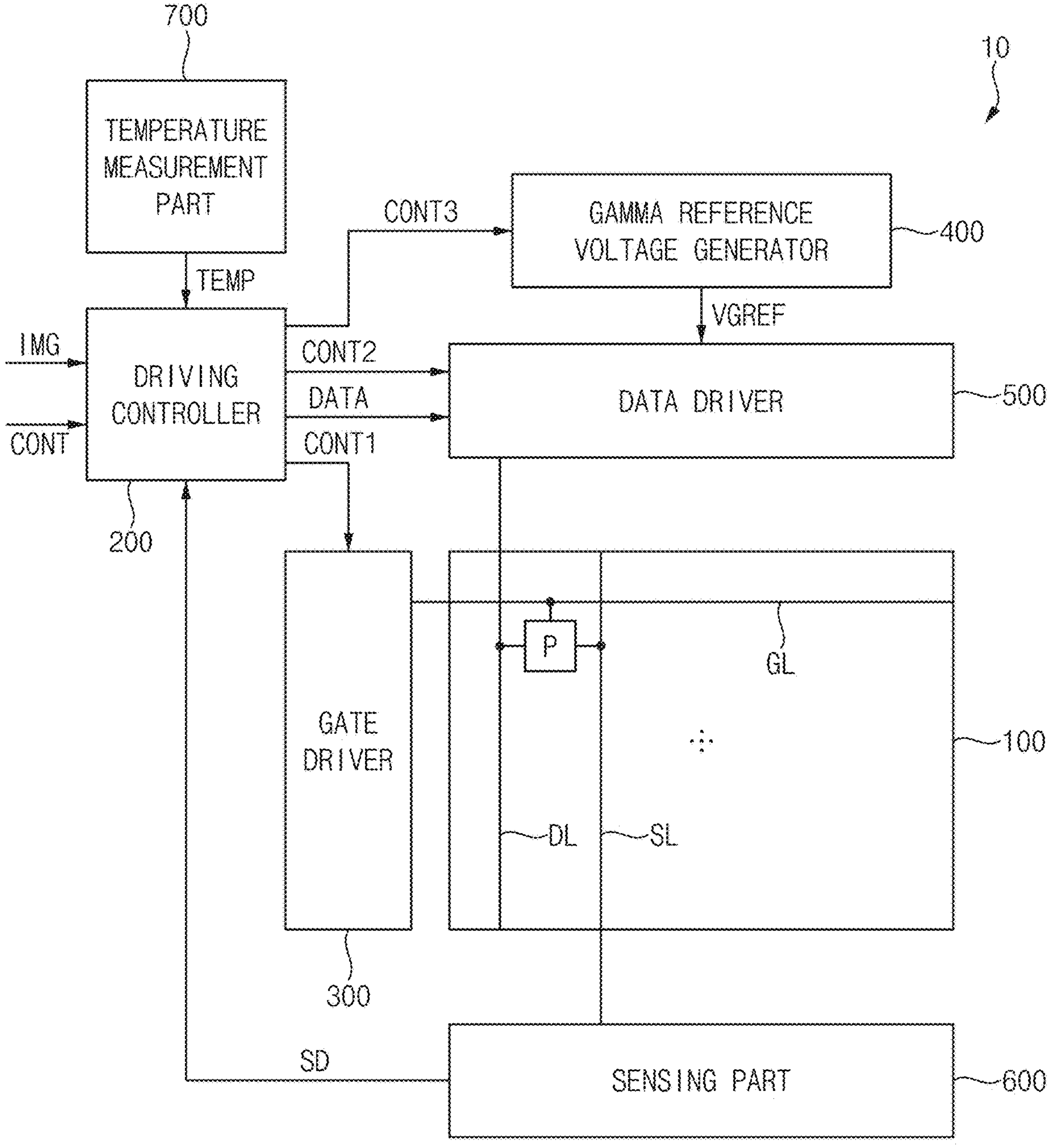
FIG. 1 is a block diagram showing a display device according to some embodiments of the present inventive concept.

FIG. 1 is a block diagram showing a display device according to some embodiments of the present inventive concept.

Referring to FIG. 1, a display device 10 may include a display panel 100 and a display panel driver. The display panel driver may include a driving controller 200, a gate driver 300, a gamma reference voltage generator 400, and a data driver 500. The display panel driver may further include a sensing part 600 and a temperature measurement part 700.

The display panel 100 may include a display area for displaying an image and a peripheral area arranged adjacent to the display aera.

The display panel 100 may include gate lines GL, data lines DL, and sub-pixels P electrically connected to the gate lines GL and the data lines DL, respectively. The gate lines GL may extend in a first direction, and the data lines DL may extend in a second direction crossing the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be arranged in the driving controller 200 or may be arranged in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The display panel 100 may further include sensing lines SL connected to the sub-pixels P. The sensing lines SL may extend in the second direction.

The sensing part 600 may sense the sub-pixels P to receive a sensing signal through the sensing lines SL, and may generate sensing data SD based on the sensing signal. The sensing data SD may include information on one or more unique electrical characteristics of the sub-pixel P, such as a threshold voltage, a mobility of a driving transistor, etc.

The temperature measurement part 700 may measure a temperature TEMP of the sub-pixels P, and may provide the temperature TEMP of the sub-pixels P to the driving controller 200.

The driving controller 200 may determine the electrical characteristics of the sub-pixel P based on the temperature TEMP of the sub-pixel P and the sensing data SD, and may compensate for the input image data IMG based on the electrical characteristics of the sub-pixel P to generate the data signal DATA.

As shown in FIG. 1, the sensing part 600 may be formed independently from the data driver 500. However, a position of the sensing part 600 is not limited thereto. The sensing part 600 may be arranged within the data driver 500.

Figure 2:
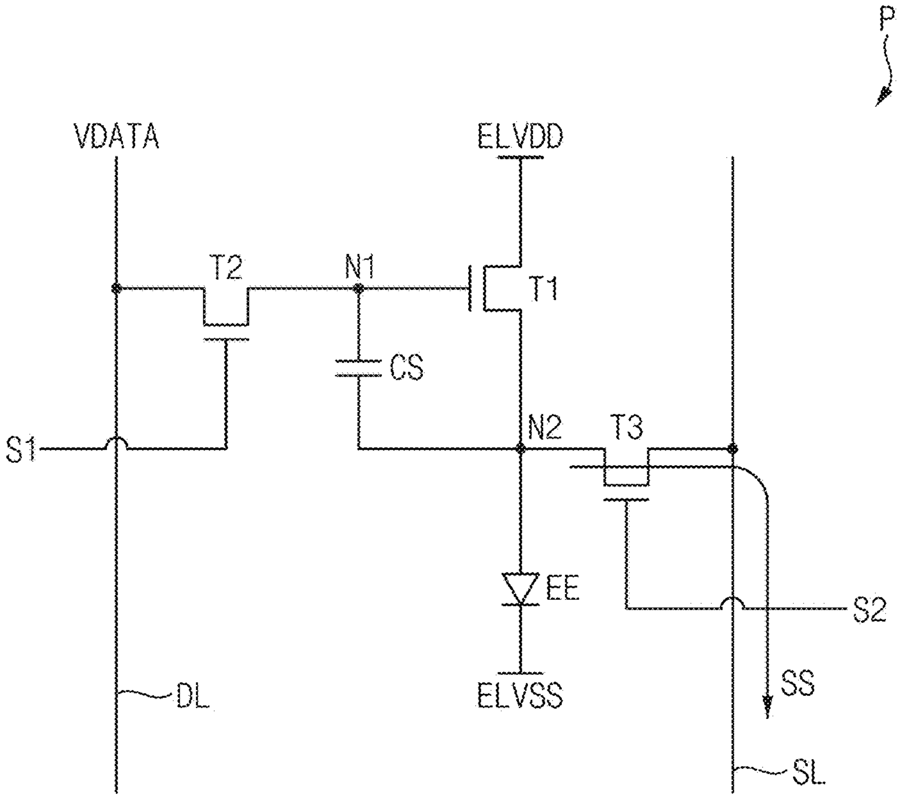
FIG. 2 is a circuit diagram showing a sub-pixel of FIG. 1, according to some embodiments of the present inventive concept.

FIG. 2 is a circuit diagram showing a sub-pixel of FIG. 1, according to some embodiments of the present inventive concept.

Referring to FIG. 1 and FIG. 2, the sub-pixel P may include a first transistor T1 (e.g., a driving transistor), which provides a first power voltage ELVDD to a second node N2 in response to a signal of a first node N1, a second transistor T2, which provides the data voltage VDATA to the first node N1 in response to a first signal S1, a third transistor T3, which provides a signal of the second node N2 to a sensing node in response to a second signal S2, a storage capacitor CS including a first electrode connected to the first node N1 and a second electrode connected to the second node N2, and a light emitting element EE including an anode connected to the second node N2 and a cathode receiving a second power voltage ELVSS that is lower than the first power voltage ELVDD.

When the sensing operation is performed, the second transistor T2 may be turned on in response to a first signal S1 having a high level and may provide the data voltage VDATA to the first node N1. The data voltage VDATA may be a sensing data voltage for sensing the electrical characteristics of the sub-pixel P. In addition, the third transistor T3 may be turned on in response to a second signal S2 having the high level and may provide a sensing signal SS to the sensing line SL.

The sensing line SL may be connected to, and provide the sensing signal SS to, the sensing part 600, and the sensing part 600 may generate the sensing data SD based on the sensing signal SS.

Figure 3:
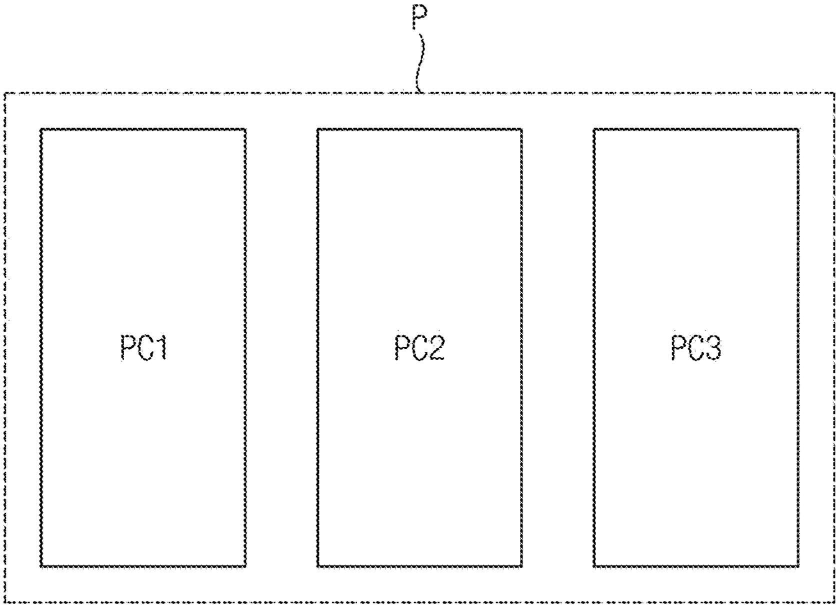
FIG. 3 is a block diagram showing a sub-pixel of FIG. 1, according to some embodiments of the present inventive concept.

FIG. 3 is a block diagram showing a sub-pixel of FIG. 1, according to some embodiments of the present inventive concept.

Referring to FIGS. 1 to 3, the display panel 100 may include a first color sub-pixel PC1, a second color sub-pixel PC2, and a third color sub-pixel PC3.

In some embodiments, the first color sub-pixel PC1 may be a red sub-pixel, the second color sub-pixel PC2 may be a green sub-pixel, and the third color sub-pixel PC3 may be a blue sub-pixel. In some other embodiments, the first color sub-pixel PC1 may be the green sub-pixel, the second color sub-pixel PC2 may be the red sub-pixel, and the third color sub-pixel PC3 may be the blue sub-pixel. In yet other embodiments, the first color sub-pixel PC1 may be the blue sub-pixel, the second color sub-pixel PC2 may be the red sub-pixel, and the third color sub-pixel PC3 may be the blue sub-pixel.

Figure 4:
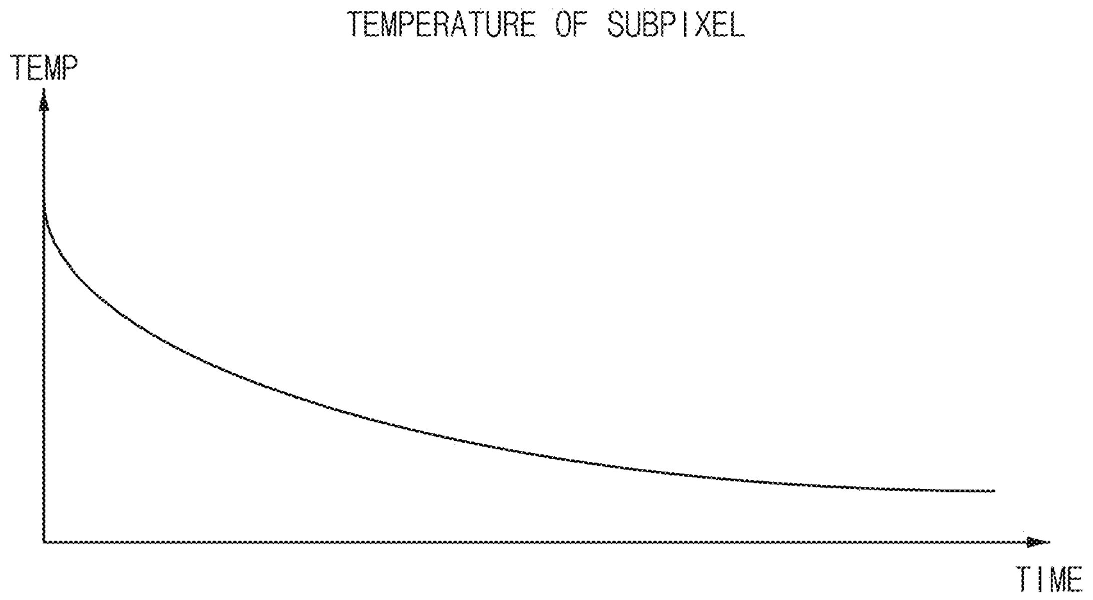
FIG. 4 is a graph showing a temperature of the sub-pixel, according to some embodiments of the present inventive concept.

FIG. 4 is a graph showing a temperature of the sub-pixel, according to some embodiments of the present inventive concept.

Referring to FIGS. 1 to 4, the sensing operation may be performed in a power-on state or a power-off state of the display device 10. However, in the power-off state of the display device 10 unlike the power-on state of the display device 10, the sensing operation may be performed for a relatively long time (e.g., several minutes), and the temperature TEMP of the sub-pixel P may change over time. For example, the temperature TEMP of the sub-pixel P may decrease over time. Therefore, when the sensing operation is performed without considering the changing temperature TEMP of the sub-pixel P, the sensing operation may be inaccurate.

The display device 10 according to some embodiments of the present inventive concept may accurately perform the sensing operation even when the sensing operation is performed for a relatively long time and the temperature TEMP of the sub-pixel P changes. Specific details of this will be described later.

Figure 5:
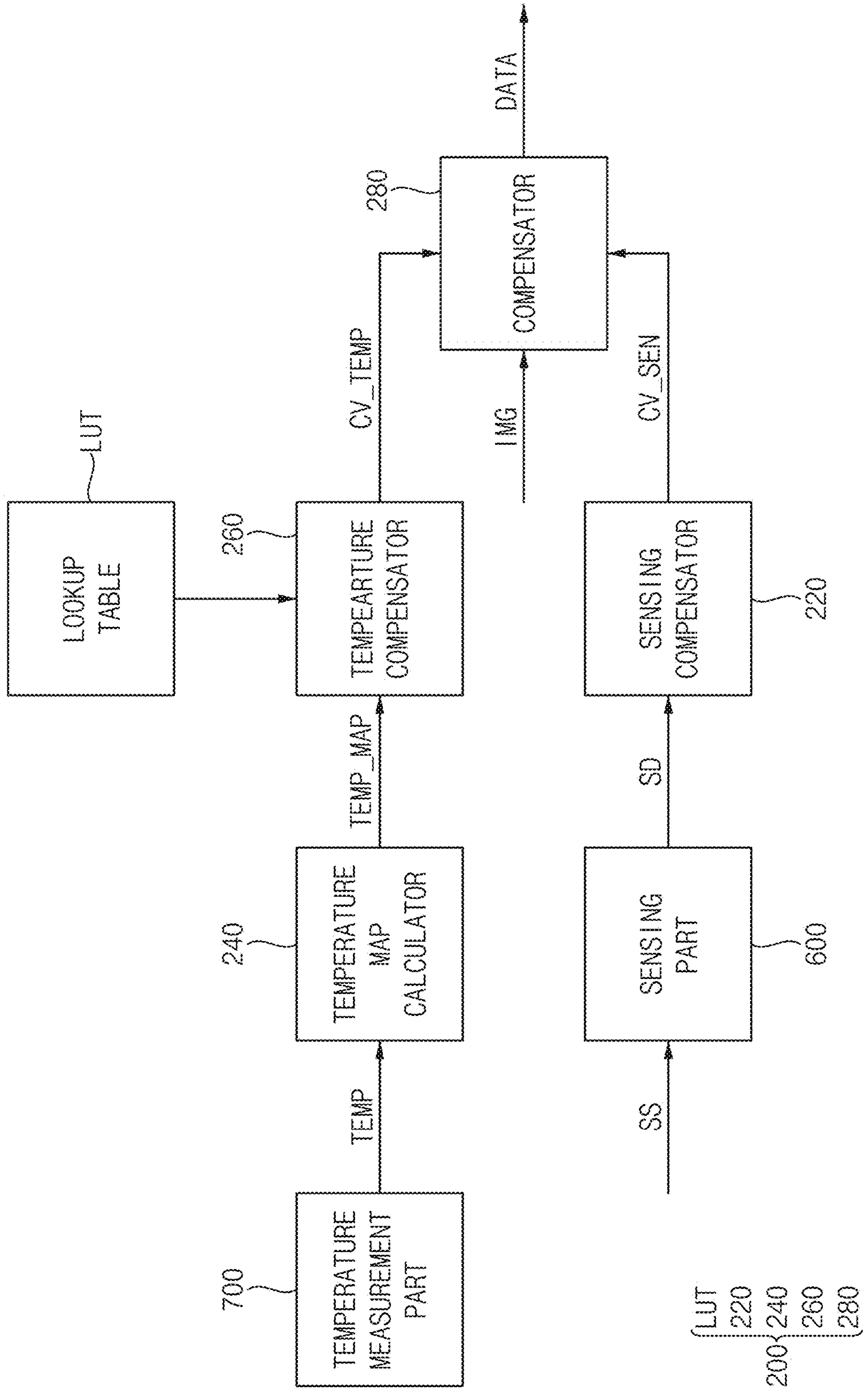
FIG. 5 is a block diagram showing a display panel driver of FIG. 1, according to some embodiments of the present inventive concept.

FIG. 5 is a block diagram showing a display panel driver of FIG. 1, according to some embodiments of the present inventive concept.

Referring to FIGS. 1 to 5, a display panel driver may perform a sensing operation by considering a changing temperature TEMP of a sub-pixel P. The display panel driver may include a sensing part 600, a sensing compensator 220, a temperature measurement part 700, a temperature map calculator 240, a lookup table LUT, a temperature compensator 260, and a compensator 280. The sensing compensator 220, the temperature map calculator 240, the lookup table LUT, the temperature compensator 260, and the compensator 280 may be included in the driving controller 200.

The sensing part 600 may generate sensing data SD based on a sensing signal SS. The sensing data SD may include information on one or more electrical characteristics of the sub-pixel P, such as a threshold voltage, mobility of the driving transistor T1, etc. For examples, the sensing part 600 may sense the first color sub-pixel PC1 to generate first sensing data, may sense the second color sub-pixel PC2 to generate second sensing data, and may sense the third color sub-pixel PC3 to generate third sensing data. The first sensing data may include information on one or more electrical characteristics of the first color sub-pixel PC1, the second sensing data may include information on one or more electrical characteristics of the second color sub-pixel PC2, and the third sensing data may include information on one or more electrical characteristics of the third color sub-pixel PC3.

The sensing compensator 220 may generate a sensing compensation value CV_SEN based on the sensing data SD. The sensing compensation value CV_SEN may be a compensation value of the sub-pixel P, which does not consider (e.g., does not involve or take into account) a temperature TEMP of the sub-pixel P. For examples, the sensing compensator 220 may generate a first sensing compensation value based on the first sensing data, a second sensing compensation value based on the second sensing data, and a third sensing compensation value based on the third sensing data. The first sensing compensation value may be a compensation value of the first color sub-pixel PC1, which does not consider the temperature TEMP of the first color sub-pixel PC1, the second sensing compensation value may be a compensation value of the second color sub-pixel PC2, which does not consider the temperature TEMP of the second color sub-pixel PC2, the third sensing compensation value may be a compensation value of the third color sub-pixel PC3, which does not consider the temperature TEMP of the third color sub-pixel PC3.

The temperature measurement part 700 may measure a temperature TEMP of the sub-pixel P. For examples, the temperature measurement part 700 may measure a temperature TEMP of the first color sub-pixel PC1, a temperature TEMP of the second color sub-pixel PC2, and a temperature TEMP of the third color sub-pixel PC3. In some embodiments, the temperature measurement part 700 may directly measure the temperature TEMP of the sub-pixel P using a temperature sensor. In some other embodiments, the temperature measurement part 700 may indirectly measure the temperature TEMP of the sub-pixel P based on the driving current according to a gate-source voltage of a driving transistor included in the sub-pixel P.

The temperature map calculator 240 may calculate (e.g. put together or construct) a temperature map TEMP_MAP based on the temperature TEMP of the sub-pixel P. For examples, the temperature map calculator 240 may calculate a first temperature map based on the temperature TEMP of the first color sub-pixel PC1, a second temperature map based on the temperature TEMP of the second color sub-pixel PC2, and a third temperature map based on the temperature TEMP of the third color sub-pixel PC3. The first temperature map may be a temperature map TEMP_MAP of the first color sub-pixel PC1, the second temperature map may be a temperature map TEMP_MAP of the second color sub-pixel PC2, and the third temperature map may be a temperature map TEMP_MAP of the third color sub-pixel PC3. In some embodiments, each of the first temperature map, the second temperature map, and the third temperature map may be generated in a unit of the sub-pixel P. That is, each of the first temperature map, the second temperature map, and the third temperature map may have values, each of which correspond to a unit of the sub-pixel P (i.e., each value corresponds to a single sub-pixel P). In some other embodiments, each of the first temperature map, the second temperature map, and the third temperature map may be generated in a unit of the sub-pixel row. That is, each of the first temperature map, the second temperature map, and the third temperature map may have values, each of which correspond to a unit of the sub-pixel row (i.e., each value corresponds to a single sub-pixel row). When the temperature map TEMP_MAP is generated in the unit of the sub-pixel P, an accuracy of the temperature TEMP of the sub-pixel P may be improved. When the temperature map TEMP_MAP is generated in the unit of the sub-pixel row, a data capacity occupied by the temperature map TEMP_MAP (i.e., the amount of data storage occupied by the temperature map TEMP_MAP) may be reduced.

The temperature compensator 260 may generate a temperature compensation value CV_TEMP based on the temperature map TEMP_MAP and a lookup table LUT. The lookup table LUT may include the temperature compensation value CV_TEMP according to the temperature TEMP of the sub-pixel P, and the temperature compensation value CV_TEMP may be an additional compensation value of the sub-pixel P, which takes into account the temperature TEMP of the sub-pixel P. For examples, the temperature compensator 260 may generate a first temperature compensation value based on the first temperature map and the first lookup table, may generate a second temperature compensation value based on the second temperature map and the second lookup table, and may generate a third temperature compensation value based on the third temperature map and the third lookup table. The first temperature compensation value may be an additional compensation value of the first color sub-pixel PC1 considering (e.g., accounting for) the temperature TEMP of the first color sub-pixel PC1, the second temperature compensation value may be an additional compensation value of the second color sub-pixel PC2 considering (e.g., accounting for) the temperature TEMP of the second color sub-pixel PC2, and the third temperature compensation value may be an additional compensation value of the third color sub-pixel PC3 considering (e.g., accounting for) the temperature TEMP of the third color sub-pixel PC3. The first lookup table may include the first temperature compensation value according to the temperature TEMP of the first color sub-pixel PC1, the second lookup table may include the second temperature compensation value according to the temperature TEMP of the second color sub-pixel PC2, and the third lookup table may include the third temperature compensation value according to the temperature TEMP of the third color sub-pixel PC3. Thus, the first to third lookup tables may each map different sub-pixel temperatures TEMP to corresponding temperature compensation values.

The compensator 280 may add the sensing compensation value CV_SEN and the temperature compensation value CV_TEMP to generate a compensation value, and may compensate for the input image data IMG based on the compensation value to generate data DATA. For examples, the compensator 280 may add the first sensing compensation value and the first temperature compensation value to generate a first compensation value, may add the second sensing compensation value and the second temperature compensation value to generate a second compensation value, and may add the third sensing compensation value and the third temperature compensation value to generate a third compensation value. The first compensation value may be a compensation value of the first color sub-pixel PC1, the second compensation value may be a compensation value of the second color sub-pixel PC2, and the third compensation value may be a compensation value of the third color sub-pixel PC3.

Figure 6:
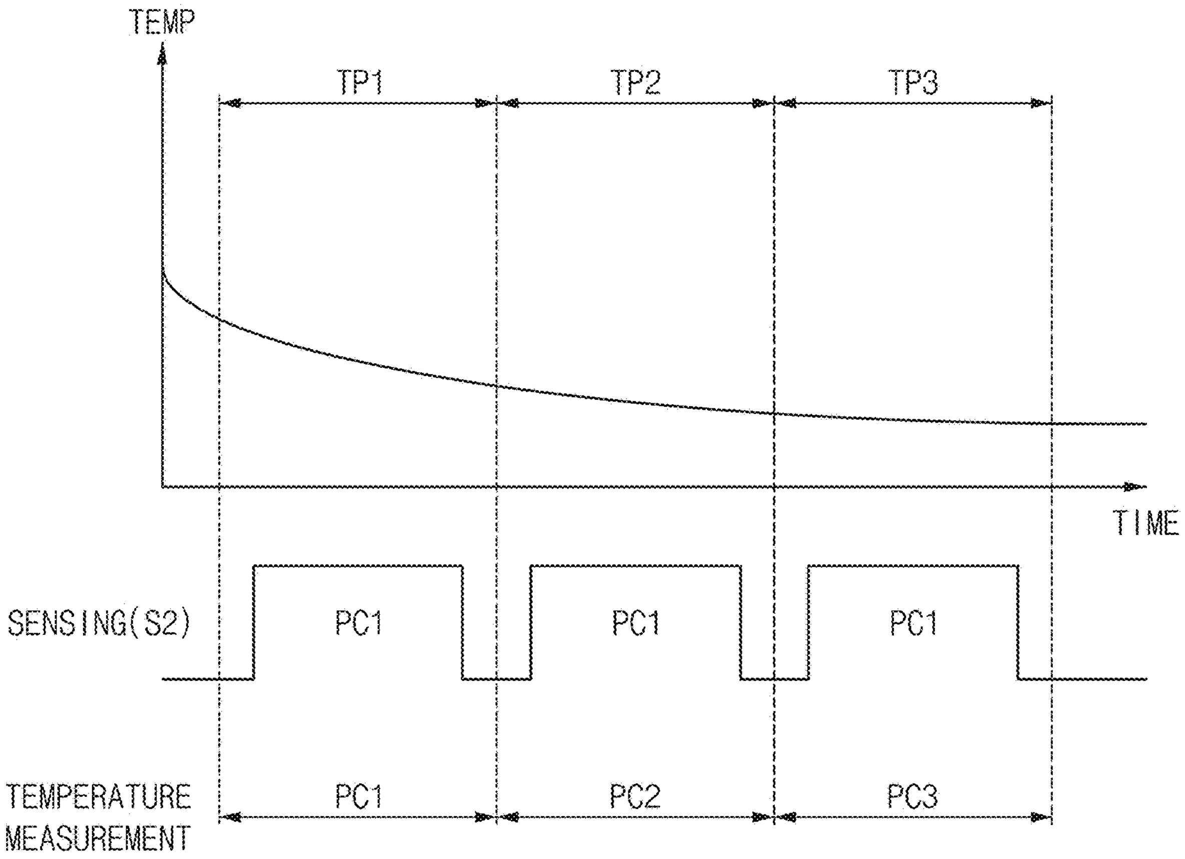
FIG. 6 is a diagram illustrating a sensing operation performed in a consideration of a changing temperature of a sub-pixel, according to some embodiments of the present inventive concept.

FIG. 6 is a diagram illustrating a sensing operation performed in a consideration of a changing temperature of a sub-pixel, according to some embodiments of the present inventive concept.

Referring to FIGS. 1 to 6, the display device 10 according to some embodiments of the present inventive concept may accurately perform the sensing operation even when the sensing operation is performed for a relatively long time (e.g., several minutes) and the temperature TEMP of the sub-pixel P changes. Therefore, the display device 10 according to some embodiments of the present inventive concept may be applied when the sensing operation takes longer than a reference period of time.

The sensing part 600 may sense the first color sub-pixel PC1 during a first period TP1, may sense the second color sub-pixel PC2 during a second period TP2 following the first period TP1, and may sense the third color sub-pixel PC3 during a third period TP3 following the second period TP2, and the temperature measurement part 700 may measure the temperature TEMP of the first color sub-pixel PC1 during the first period TP1, may measure the temperature TEMP of the second color sub-pixel PC2 during the second period TP2, and may measure the temperature TEMP of the third color sub-pixel PC3 during the third period TP3.

When the temperature measurement part 700 measures a temperature TEMP of a sub-pixel P of a specific period, rather than a temperature TEMP of a sub-pixel P of a specific time point (e.g., the start point of the first period TP1), the sensing operation may become more accurate. In addition, when the temperature measurement part 700 measures the temperature TEMP of the sub-pixel P during a sensing period TP1, TP2, TP3 of the sub-pixel P, the sensing operation may become more accurate. For examples, the temperature measurement part 700 may measure the temperature TEMP of the first color sub-pixel PC1 during a sensing period TP1 of the first color sub-pixel PC1, may measure the temperature TEMP of the second color sub-pixel PC2 during a sensing period TP2 of the second color sub-pixel PC2, and may measure the temperature TEMP of the third color sub-pixel PC3 during a sensing period TP3 of the third color sub-pixel PC3.

As such, even when the sensing operation is performed for a relatively long time (e.g., several minutes) and the temperature TEMP of the sub-pixel P changes, the display device 10 may measure the temperature TEMP of the sub-pixel P during a sensing period TP1, TP2, TP3 of the sub-pixel P and compensate for the input image data IMG based on the temperature TEMP of the sub-pixel P and the sensing data SD. Accordingly, the sensing operation may be performed accurately.

Figure 7:
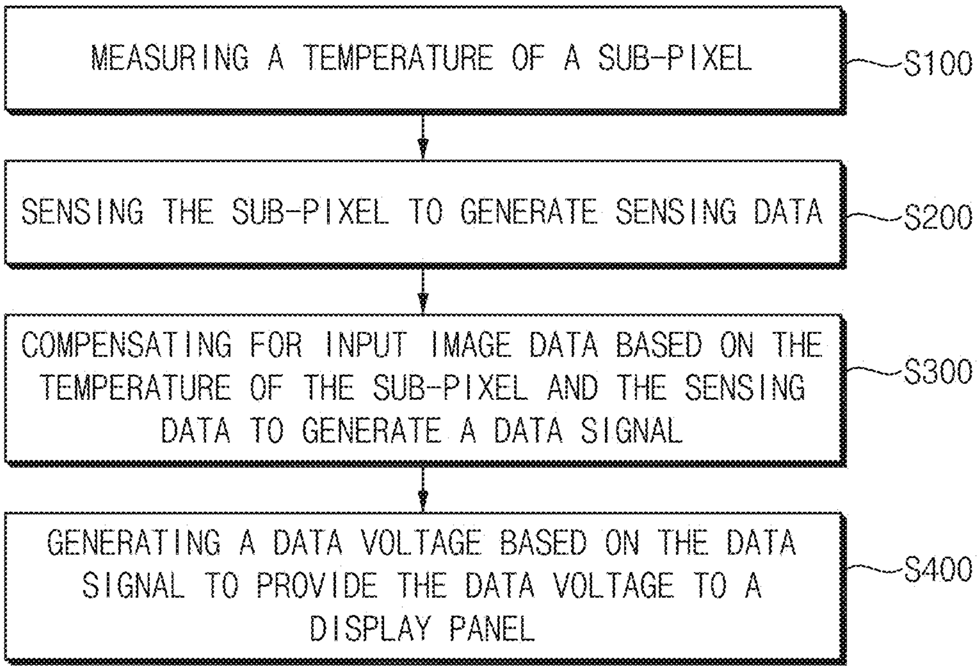
FIG. 7 is a flowchart showing a method of driving a display device according to some embodiments of the present inventive concept.

FIG. 7 is a flowchart showing a method of driving a display device according to some embodiments of the present inventive concept.

Referring to FIG. 7, a method of driving a display device 10 according to embodiments of the present inventive concept may include measuring a temperature TEMP of a sub-pixel P (S100), sensing the sub-pixel P to generate sensing data SD (S200), compensating for input image data IMG based on the temperature TEMP of the sub-pixel P and the sensing data SD to generate a data signal DATA (S300), and generating a data voltage VDATA based on the data signal DATA and to provide the data voltage VDATA to the display panel 100 (S400). In some examples, during a first period TP1, a first color sub-pixel PC1 may be sensed to generate first sensing data, and a temperature TEMP of the first color sub-pixel PC1 may be measured. During a second period TP2 following the first period TP1, the second color sub-pixel PC2 may be sensed to generate second sensing data, and a temperature TEMP of the second color sub-pixel PC2 may be measured. During a third period TP3 following the second period TP2, the third color sub-pixel PC3 may be sensed to generate third sensing data, and a temperature TEMP of the third color sub-pixel TP3 may be measured.

In some embodiments, when a sensing operation takes a reference period of time or longer, the input image data IMG may be compensated based on the temperature TEMP of the sub-pixel P and the sensing data SD.

In some embodiments, when the display device 10 is powered off, the input image data IMG may be compensated based on the temperature TEMP of the sub-pixel P and the sensing data SD.

The method of driving the display device 10 of FIG. 7 is substantially to the same as that of the display device 10 of FIG. 1. Therefore, repeat descriptions may not be provided.

Figure 8:
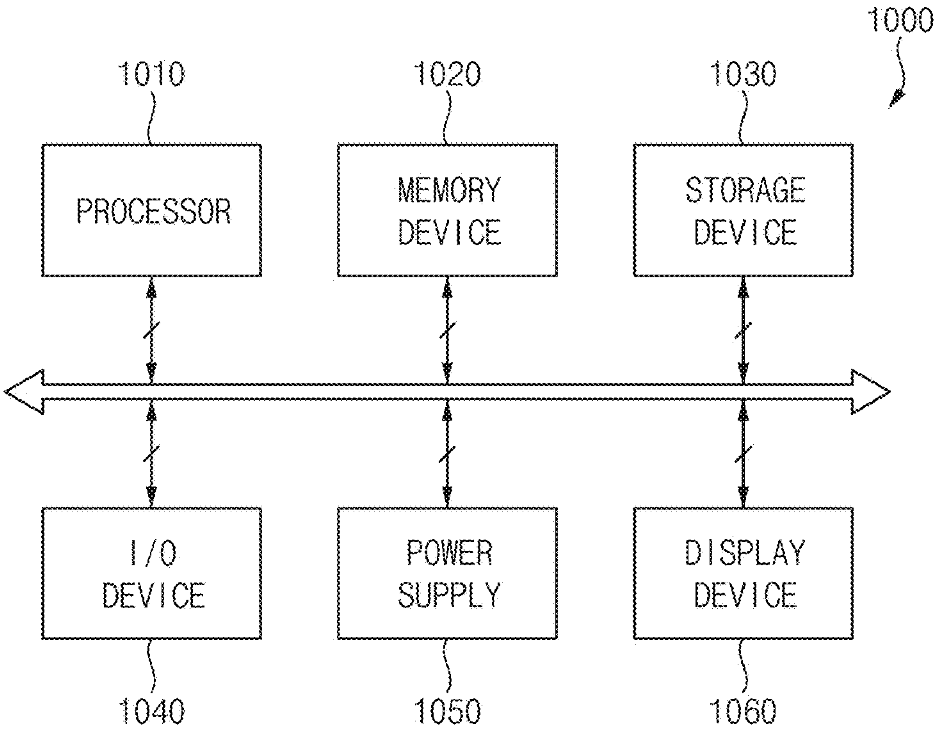
FIG. 8 is a block diagram showing an electronic device, according to some embodiments of the present inventive concept.
Figure 9:
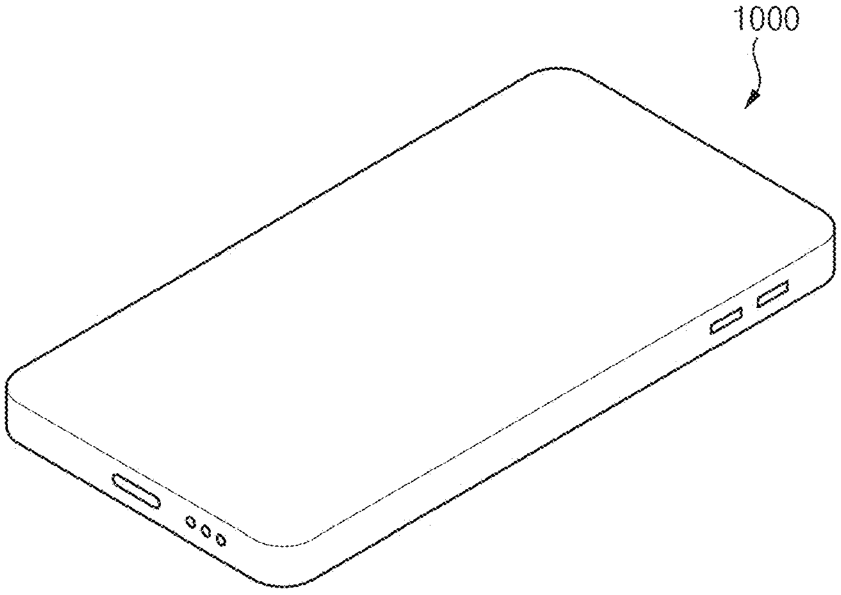
FIG. 9 is a diagram showing the electronic device of FIG. 8 being implemented as a smart phone, according to some embodiments of the present inventive concept.

FIG. 8 is a block diagram showing an electronic device, according to some embodiments of the present inventive concept. FIG. 9 is a diagram showing the electronic device of FIG. 8 being implemented as a smart phone, according to some embodiments of the present inventive concept.

Referring to FIGS. 8 and 9, an electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In some embodiments, as illustrated in FIG. 9, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, if the term "substantially" is used in combination with a feature that could be expressed using a numeric value, the term "substantially" denotes a range of +/−5% of the value centered on the value.

As used herein, the terms "use," "using," and "used" may be considered synonymous with the terms "utilize," "utilizing," and "utilized," respectively.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The display device 10 and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the display device 10 may be formed on one integrated circuit (IC) chip or on separate IC chips. Further, the various components of the display device 10 may be implemented on a flexible printed circuit film, a tape carrier package (TCP), a printed circuit board (PCB), or formed on a same substrate. Further, the various components of the display device 10 may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The foregoing is illustrative of the inventive concept and is not to be construed as limiting thereof. Although a few embodiments of the inventive concept have been described, those skilled in the art will readily appreciate that many modifications are possible in some embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device performing a sensing operation, comprising:

a display panel comprising a sub-pixel;

a temperature measurement part configured to measure a temperature of the sub-pixel;

a sensing part configured to sense the sub-pixel to generate sensing data;

a driving controller configured to compensate for input image data based on the temperature of the sub-pixel and the sensing data to generate a data signal; and a data driver configured to generate a data voltage based on the data signal to provide the data voltage to the display panel, wherein the display panel comprises a first color sub-pixel, a second color sub-pixel, and a third color sub-pixel, wherein the sensing part is configured to sense the first color sub-pixel to generate first sensing data during a first period, to sense the second color sub-pixel to generate second sensing data during a second period following the first period, and to sense the third color sub-pixel to generate third sensing data during a third period following the second period, wherein the temperature measurement part is configured to measure a temperature of the first color sub-pixel during the first period, to measure a temperature of the second color sub-pixel during the second period, and to measure a temperature of the third color sub-pixel during the third period, and wherein the driving controller is configured to compensate for the input image data based on the temperature of the sub-pixel and the sensing data in response to the sensing operation taking longer than a reference period of time.

2. The display device of claim 1, wherein the driving controller is configured to compensate for the input image data based on the temperature of the sub-pixel and the sensing data in response to the display device being powered off.

3. The display device of claim 1, wherein the temperature of the sub-pixel changes over time.

4. The display device of claim 3, wherein the temperature of the sub-pixel decreases over time.

5. The display device of claim 1, wherein the driving controller is configured to calculate a first temperature map based on the temperature of the first color sub-pixel, to calculate a second temperature map based on the temperature of the second color sub-pixel, and to calculate a third temperature map based on the temperature of the third color sub-pixel.

6. The display device of claim 5, wherein the first temperature map, the second temperature map, and the third temperature map are generated in a unit of the sub-pixel.

7. The display device of claim 5, wherein the first temperature map, the second temperature map, and the third temperature map are generated in a unit of a sub-pixel row.

8. The display device of claim 5, wherein the driving controller is configured to generate a first temperature compensation value based on the first temperature map and a first lookup table, to generate a second temperature compensation value based on the second temperature map and a second lookup table, and to generate a third temperature compensation value based on the third temperature map and a third lookup table.

9. The display device of claim 8, wherein the driving controller is configured to generate a first sensing compensation value based on the first sensing data, a second sensing compensation value based on the second sensing data, and a third sensing compensation value based on the third sensing data.

10. The display device of claim 9, wherein the driving controller is configured to add the first temperature compensation value and the first sensing compensation value to generate a compensation value of the first color sub-pixel, to add the second temperature compensation value and the second sensing compensation value to generate a compensation value of the second color sub-pixel, and to add the third temperature compensation value and the third sensing compensation value to generate a compensation value of the third color sub-pixel.

11. The display device of claim 1, wherein the first color sub-pixel is a red sub-pixel, the second color sub-pixel is a green sub-pixel, and the third color sub-pixel is a blue sub-pixel.

12. The display device of claim 1, wherein the first color sub-pixel is a green sub-pixel, the second color sub-pixel is a red sub-pixel, and the third color sub-pixel is a blue sub-pixel.

13. The display device of claim 1, wherein the first color sub-pixel is a blue sub-pixel, the second color sub-pixel is a red sub-pixel, and the third color sub-pixel is a green sub-pixel.

14. The display device of claim 1, wherein the temperature measurement part is configured to measure the temperature of the sub-pixel using a temperature sensor.

15. The display device of claim 1, wherein the temperature measurement part is configured to measure the temperature of the sub-pixel based on a driving current according to a gate-source voltage of a driving transistor comprised in the sub-pixel.

16. The display device of claim 1, wherein the sensing part is comprised in the data driver.

17. A method of driving a display device performing a sensing operation, the method comprising:
measuring a temperature of a sub-pixel;
sensing the sub-pixel to generate sensing data;
compensating for input image data based on the temperature of the sub-pixel and the sensing data to generate a data signal; and
generating a data voltage based on the data signal to provide the data voltage to a display panel,
wherein a first color sub-pixel is sensed to generate first sensing data, and a temperature of the first color sub-pixel is measured during a first period,
wherein a second color sub-pixel is sensed to generate second sensing data, and a temperature of the second color sub-pixel is measured during a second period following the first period,
wherein a third color sub-pixel is sensed to generate third sensing data, and a temperature of the third color sub-pixel is measured during a third period following the second period, and
wherein the input image data is compensated based on the temperature of the sub-pixel and the sensing data in response to the sensing operation taking longer than a reference period of time.

18. An electronic device performing a sensing operation, comprising:
a display panel comprising a sub-pixel;
a temperature measurement part configured to measure a temperature of the sub-pixel;
a sensing part configured to sense the sub-pixel to generate sensing data;
a driving controller configured to compensate for input image data based on the temperature of the sub-pixel and the sensing data to generate a data signal;
a data driver configured to generate a data voltage based on the data signal to provide the data voltage to the display panel; and
a processor configured to provide the input image data to the driving controller, wherein the display panel comprises a first color sub-pixel, a second color sub-pixel, and a third color sub-pixel,
wherein the sensing part is configured to sense the first color sub-pixel to generate first sensing data during a first period, to sense the second color sub-pixel to generate second sensing data during a second period following the first period, and to sense the third color sub-pixel to generate third sensing data during a third period following the second period,
wherein the temperature measurement part is configured to measure a temperature of the first color sub-pixel during the first period, to measure a temperature of the second color sub-pixel during the second period, and to measure a temperature of the third color sub-pixel during the third period, and
wherein the driving controller is configured to compensate for the input image data based on the temperature of the sub-pixel and the sensing data in response to the sensing operation taking longer than a reference period of time.

* * * * *